(12) United States Patent
Eslambolchi

(10) Patent No.: US 6,243,454 B1
(45) Date of Patent: Jun. 5, 2001

(54) NETWORK-BASED CALLER SPEECH MUTING

(75) Inventor: Hossein Eslambolchi, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/129,492

(22) Filed: Aug. 5, 1998

(51) Int. Cl.⁷ ..................................... H04M 3/42
(52) U.S. Cl. .......... 379/202; 379/204; 370/260; 370/264
(58) Field of Search ..................... 379/219, 220, 379/229, 202, 204, 421; 370/260, 261, 262, 263, 264, 265, 266, 267, 268, 269

(56) References Cited

U.S. PATENT DOCUMENTS 5,724,416   3/1998   Foladare et al. ..................... 379/202

OTHER PUBLICATIONS

Application Brown C., DeCaluwe C.L., and DeTrana N.D. 1–6–10–38.

*Primary Examiner*—Creighton Smith
(74) *Attorney, Agent, or Firm*—Robert B. Levy

(57) ABSTRACT

A switch (26) in a telecommunications network (34) monitors a call placed by a calling party (12) to a called party (14) to detect the presence of prescribed condition, such as the entry by the caller of a self-muting signal, or an excessive level of background noise. Upon detecting the occurrence of the prescribed condition, the switch mutes the outgoing speech of the calling party while passing to the calling party the speech of the called party.

12 Claims, 1 Drawing Sheet

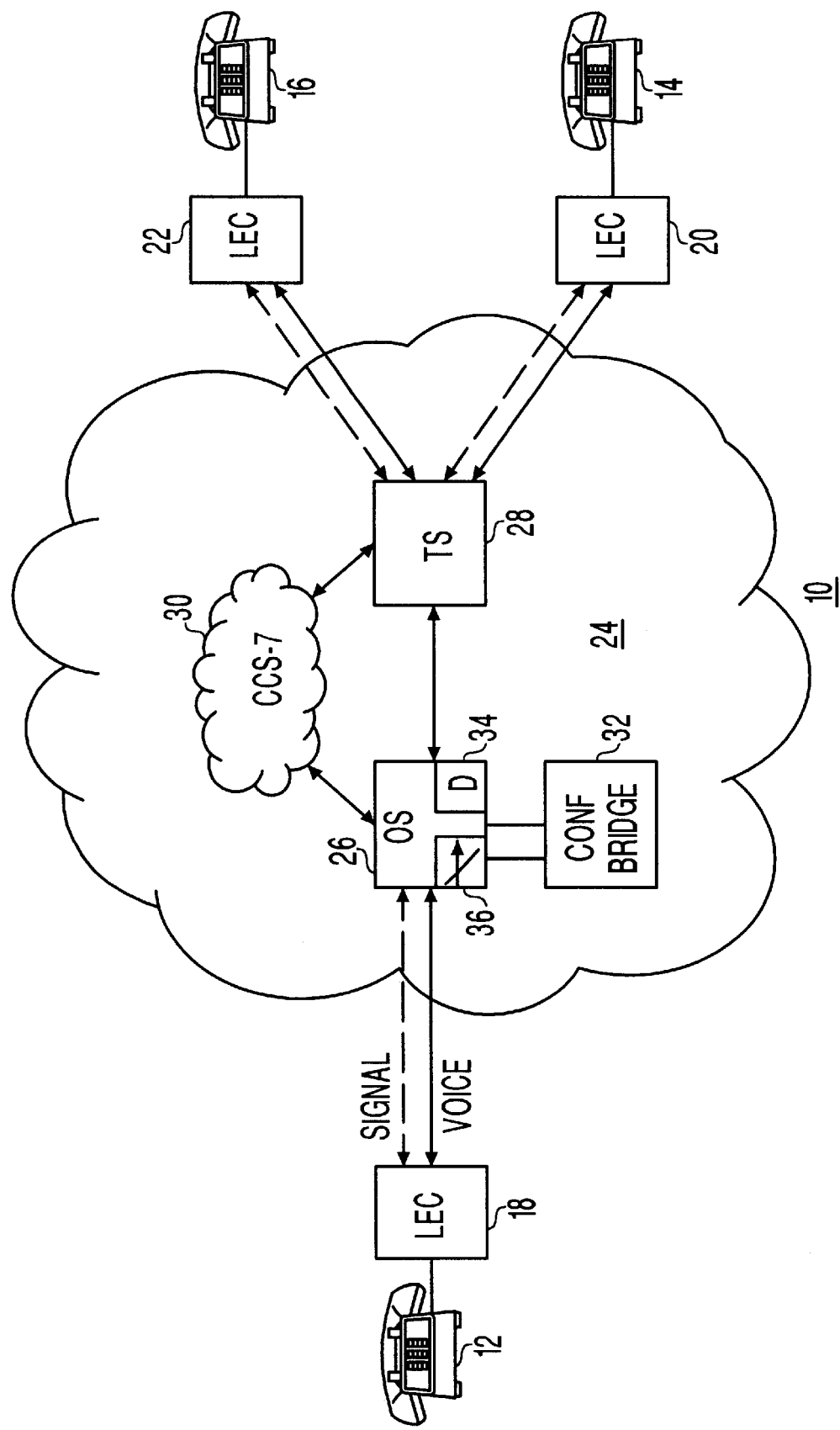

NETWORK-BASED CALLER SPEECH MUTING

TECHNICAL FIELD

This invention relates to a technique for muting a caller's outgoing speech.

BACKGROUND ART

Many telephone callers must place calls from noisy environments. For example, travelers must often use pay phones or wireless terminals from locations such as airports or train stations, for example, that suffer from high ambient noise levels. The ambient noise at such locations often over powers the caller's speech, causing the telephone set to transmit noise rather than intelligible speech to the called party. The noise received from a caller originating a call from a noisy location is especially irritating during a conference call when the caller is but one of many participants.

Presently, various techniques exist to address the problem of ambient noise interfering with a caller's speech for calls originated from noisy locations. For example, AT&T now employs speech-processing equipment within its telecommunications network to filter callers' speech to reduce the effect of ambient noise. While such speech processing equipment is generally effective, high levels of ambient noise can defeat such filtering. Rather than utilize complex filtering techniques, subscribers who have telephone sets that offer a mute feature can self-mute their outgoing speech. Unfortunately, not all pay phones or wireless terminals offer muting capability so that a subscriber seeking to mute his or her speech must manually cover the terminal microphone, often at great inconvenience. Moreover, even if a calling party has a mute feature on his or her telephone, the caller may not know that the level of background noise is so excessive as to interfere with the caller's speech.

In connection with conference calls, U.S. patent application Ser. No. 09/133,118, filed Aug. 12, 1998 in the name of Brian Brown et al., and assigned to AT&T, discloses a technique for enabling a first conference call participant to selectively mute other participants to the conference call. In this way, two or more participants can conduct a private conversation to the exclusion of all others. While the muting technique taught by Brown et al. affords the opportunity to mute individual callers, the technique does so only in connection with a conference call, rather than a conventional two-party call. Moreover, the muting technique of Brown et al. mutes both the incoming and outgoing speech of participants. Thus, Brown et al. provides no mechanism to allow a caller to self-mute only outgoing speech, nor does Brown et al. accomplish automatic muting of only outgoing speech in response to a high noise level.

Thus, there is need for a technique for enabling a caller to self-mute outgoing speech while still receiving speech from a called party.

BRIEF SUMMARY OF THE INVENTION

Briefly, in accordance with the invention, a method is provided for muting a caller's outgoing speech. To mute a caller's outgoing speech, a telecommunication switch in a network monitors the call originated by the caller for a prescribed condition. The prescribed condition may comprise receipt of an in-band self-muting signal, typically in the form of a particular Dual Tone Multi-Frequency (DTMF) sequence, say #1 or *1 for example, or an out-of band self-muting signal, such as an Integrated Services Digital network (ISDN) call set up message. In response to the self-muting signal, the switch mutes the speech originating by the calling party while passing to the calling party the speech from each called party. In this way, the caller may self-mute his or her speech while continuing to hear speech from each called party.

The prescribed condition may also include excessive noise received from the caller, such as may occur when the caller calls from a noisy location. When the switch detects excessive noise, then the switch mutes the caller's outgoing speech even though the called party did not generate a self-mute signal. While the switch mutes the caller's outgoing speech, the caller continues to receive speech from each called party.

BRIEF SUMMARY OF THE DRAWING

FIG. 1 shows a block schematic diagram of a telecommunications network for practicing the present invention.

DETAILED DESCRIPTION

FIG. 1 shows a telecommunications network 10 for completing a call between a calling party, represented by telephone set 12, and one or more called parties, represented by telephone sets 14 and 16. Each of telephone sets 12, 14, and 16 may comprise a conventional analog station set, or an ISDN terminal. In the illustrated embodiment, the telephone sets 12, 14, and 16 receive local service (dial tone) from Local Exchange Carriers (LEC) 18, 20 and 22, respectively. It should be understood that any of the LECs 18, 20, and 22 could serve two or more of the telephone sets 14, 16, and 18.

An Inter-eXChange (IXC) network 24, such as the IXC network maintained by AT&T, typically carries calls between telephone sets served by different LECs, such as telephone sets 12 and 14 served by LECS 18 and 20, respectively. A call originated by telephone set 12 passes from the serving LEC 18 to the IXC network 24 for receipt in the network at an originating toll switch, such as switch 26 that is associated or "homed" with the LEC 18. The originating switching switch 26 routes the call originated by the telephone set 12 to a terminating toll switch associated with the LEC serving the called party, such as the LEC 20 that serves the telephone set 14. In the illustrated embodiment, the originating toll switch 26 routes the call to the terminating toll switch 28 directly, although in practice, the originating switch may route the call through one or more intermediate (via) toll switches (not shown). Both the switches 24 and 26 typically comprise Model 4ESS telephone switches available from Lucent Technologies.

In addition to the toll switches 26 and 28, the IXC network 24 also includes a signaling network, such as AT&T's Common Channel Signaling (CCS) network. The signaling network 30 carries out-of band signaling messages to and from the switches 26 and 28 (as well as the via switches) to facilitate set-up and tear down of calls, as well as other logic associated with call flow.

The IXC network 24 may also include at least one conference bridge, such as the conference bridge 32 associated with the toll switch 26. The conference bridge 32 allows bridging of callers, thus permitting three or more parties on a single call. Although the illustrated embodiment of network 24 depicts a single conference bridge 32, in actuality, the network will typically include a plurality of bridges, each associated with a toll switch.

Not infrequently, the network 10 may carry a call originated at a telephone set, such as telephone set 12, situated in a location subject to high levels of ambient noise, such as an airport, train station, bus terminal, or along a busy street. The high level of background noise often interferes with the calling party's speech and may cause the network to transmit the noise, thus interfering with the called party's ability comprehend the called party's speech. A high level of noise from a calling party is especially irritating during a conference call because such noise may drown out the speech of other participants.

In accordance with the invention, the IXC network 24 advantageously overcomes the problem of high background noise levels interfering with a caller's speech by muting a caller's outgoing speech in response to a predetermined condition. As described below, the prescribed condition may comprise receipt of an in-band self-muting signal, typically in the form of a particular DTMF sequence, "*1" for example, or an out-of band signal, such as an ISDN call set up message. The prescribed condition may also include excessive noise received from the calling party as may occur when the party originates the call from a noisy location.

To monitor for the above-described conditions, each originating switch, such as OS 26, includes a detector 34 that monitors an incoming phone call to detect excessive levels of noise. The detector 34 also monitors the call for to detect a self-muting signal entered by the calling party. The calling party-entered self-muting signal may comprise an in-band signal, typically in the form of a particular Dual Tone Multi-Frequency (DTMF) sequence, say #1 for example, or an out-of band signal, such as an Integrated Services Digital network (ISDN) call set up message. (To the extent that switch 28 originates calls from one or both of the telephone sets 14 and 16, the switch would also include a detector having the same functionality as detector 34.)

In response to the excessive noise and/or receipt of a self muting signal, the detector 34 signals an outgoing path connection mechanism 36 that switches the caller's outgoing speech to mute such speech. The outgoing path connection mechanism 36 mutes the caller's outgoing speech until the detector 34 detects a drop in the background noise level below a prescribed threshold or until the detector detects a signal from the calling party to cancel the self-muting. The self-muting cancellation signal could comprise a particular DTMF sequence, such as #1, or an out-of-band ISDN signal. Upon detecting such a change in the prescribed condition, the detector 34 signals the outgoing path connection mechanism 36 to pass the caller's outgoing speech.

During intervals while the outgoing path connection mechanism 36 mutes the calling party's outgoing speech, the calling party receives incoming speech from the called party. Thus, regardless of a high background noise level, or the desire of the calling party to mute his or her speech, the calling party continues to hear the called party. In many instances, a calling party desires to listen more than talk, especially in the course of a conference call. Thus, the combination of the detector 34 and outgoing path connection mechanism 36 allows a calling party participating in a conference call to listen, but not talk.

The foregoing provides a technique for muting the outgoing speech of a calling party in response to a prescribed condition while permitting the calling party to receive the speech of each called party.

What is claimed is:

1. In connection with a telephone call carried in a telecommunications network from a calling party to a called party, a method for muting the calling party's outgoing speech, comprising the steps of: monitoring at a switch in the network for a prescribed condition during the call; and responsive to the occurrence of said prescribed condition, muting speech from said calling party to said called party while passing speech from said called party to said calling party.

2. The method according to claim 1 wherein the switch monitors for background noise that exceeds a prescribed level.

3. The method according to claim 1 wherein the switch monitors for entry by the calling party of a self-muting signal.

4. The method according to claim 3 wherein the switch monitors for entry of an in-band self-muting signal.

5. The method according to claim 4 wherein the switch monitors for entry of a prescribed sequence of Dual-Tone Multi-Frequency signals.

6. The method according to claim 3 wherein the switch monitors for entry of an out-of-band self-muting signal.

7. In connection with a conference call carried in a telecommunications network between a plurality of conference call participants, a method for muting at least one conference call participant's outgoing speech, comprising the steps of:

monitoring at a switch in the network for a prescribed condition during a call from said one participant; and responsive to the occurrence of said prescribed condition, muting speech from said one participant to other conference call participants party while passing speech from said other conference call participants to said one conference call participant.

8. The method according to claim 7 wherein the switch monitors for background noise that exceeds a prescribed level.

9. The method according to claim 7 wherein the switch monitors for entry by said one conference call participant of a self-muting signal.

10. The method according to claim 9 wherein the switch monitors for entry of an in-band self-muting signal.

11. The method according to claim 10 wherein the switch monitors for entry of a prescribed sequence of Dual-Tone Multi-Frequency signals.

12. The method according to claim 9 wherein the switch monitors for entry of an out-of-band self-muting signal.

* * * * *